United States Patent
Lyman et al.

(10) Patent No.: US 9,727,932 B1
(45) Date of Patent: Aug. 8, 2017

(54) SYSTEMS AND METHODS FOR PROMOTIONAL VALIDATION OF TRAVEL EXPENSES

(71) Applicants: Ian Graves Lyman, Beaverton, OR (US); Tov Arneson, Beaverton, OR (US); Alexander Wilhelm, Beaverton, OR (US)

(72) Inventors: Ian Graves Lyman, Beaverton, OR (US); Tov Arneson, Beaverton, OR (US); Alexander Wilhelm, Beaverton, OR (US)

(73) Assignee: Parkt, Inc.

(*) Notice: Subject to any disclaimer, the term of this patent is extended or adjusted under 35 U.S.C. 154(b) by 0 days.

(21) Appl. No.: 14/831,803

(22) Filed: Aug. 20, 2015

Related U.S. Application Data

(63) Continuation-in-part of application No. 14/054,517, filed on Oct. 15, 2013, now Pat. No. 9,135,580.

(60) Provisional application No. 61/713,921, filed on Oct. 15, 2012, provisional application No. 62/039,897, filed on Aug. 20, 2014.

(51) Int. Cl.
   *G06K 15/00* (2006.01)
   *G06Q 50/14* (2012.01)
   *G06Q 30/02* (2012.01)

(52) U.S. Cl.
   CPC ......... *G06Q 50/14* (2013.01); *G06Q 30/0215* (2013.01)

(58) Field of Classification Search
   USPC ....................................... 235/378; 705/5, 13
   See application file for complete search history.

(56) References Cited

U.S. PATENT DOCUMENTS

| | | |
|---|---|---|
| 6,085,124 A | 7/2000 | Choi |
| 2002/0077953 A1 | 6/2002 | Dutta |
| 2008/0051951 A1 | 2/2008 | Camacho |
| 2012/0130777 A1 | 5/2012 | Kaufman |
| 2012/0310712 A1 | 12/2012 | Baughman et al. |
| 2013/0143536 A1 | 6/2013 | Ratti |
| 2013/0214041 A1 | 8/2013 | Wright |
| 2013/0346121 A1 | 12/2013 | Shealy et al. |
| 2014/0257943 A1 | 9/2014 | Nerayoff et al. |

*Primary Examiner* — Allyson Trail

(57) ABSTRACT

Disclosed is a system to validate promotional offers in the nature of a reduction or rebate of certain travel expenses through a network of local merchants who offer to offset travel costs in exchange for patronage. The system allows verification of the travel and the purchases.

4 Claims, 21 Drawing Sheets

SYSTEMS AND METHODS FOR PROMOTIONAL VALIDATION OF TRAVEL EXPENSES

SUMMARY

Disclosed is a system to validate promotional offers in the nature of a reduction or rebate of certain travel expenses through a network of local merchants who offer to offset travel costs in exchange for patronage. The system allows verification of the travel and the purchases.

BACKGROUND

Applicant is not aware of any system capable of validating promotional offers in the nature of a reduction or a rebate of travel expenses through a network of local merchants who offer to offset travel costs in exchange for patronage.

Shopping online has become a popular alternative to shopping locally at offline or "brick and mortar" businesses. Indeed, the popularity of online shopping has had a deleterious effect on the continued viability of many brick-and-mortar businesses, driving smaller mom-and-pop operations to shut down. The commercial centers and urban cores that house these businesses have felt a corresponding drop in commercial activity and loss of tax revenue. A primary driver in the growth of online shopping has been the introduction of conditional free shipping by online retailers. Conditional free shipping lowers costs (shipping and carriage fees) to customers while serving to increase the average spend per transaction by tapping consumer psychology.

Parking validation has long been utilized by both parking operators and other businesses to help consumers offset the cost of parking associated with visiting a particular business district or establishment. Parking validation is typically a co-operative effort between restaurants, retailers and other businesses (validators) and parking facilities, wherein validators subsidize (in part or whole) the parking fees of visitors as who patronize their business. Parking facilities typically charge participating validators incrementally per validation, or charge validators a predetermined amount for a line-of-credit (monthly, yearly). Validators participate in parking validation programs as a measurable way to increase sales at a relatively nominal cost and to foster long-term customer loyalty. Some parking validation programs are typically operated via a paper ticket with a stamp and/or written marking to denote validation. Some parking validation programs utilize an electronically printed paper receipt printed with a bar code that can be used to track validation. Parking validation programs limit consumers to validating with only a single validator. Parking validation programs are typically operated on a garage by garage basis. A single garage will accept validation by a select group of validators and a given validator will only validate parking at a single garage.

OBJECTS AND FEATURES

A primary object and feature of the present invention is to promote free or reduced-fee travel expenses to encourage consumers to "ship themselves free" to participating merchants using participating travel providers.

It is a further object and feature of the present invention to promote groups of local merchants by encouraging shopping with local merchants during travel sessions with relevant, targeted promotional offers.

It is a further object and feature of the present invention to promote discounted travel to consumers.

It is yet another object and feature of the present invention to provide verification of the travel and verification of the purchases to prevent fraudulent redemption.

Another primary object and feature of the present invention is to provide such a system that is safe, efficient, trustworthy, inexpensive and handy. Other objects and features of the present invention will become apparent with reference to the following descriptions.

CROSS REFERENCE TO RELATED APPLICATIONS

The present application is related to and claims priority from prior utility application Ser. No. 14/054,517 filed Oct. 15, 2013 the contents of which are incorporated herein by this reference and are not admitted to be prior art with respect to the present invention by the mention in this cross-reference section.

The present application is related to and claims priority from prior provisional application Ser. No. 62/039,897 filed Aug. 20, 2014 the contents of which are incorporated herein by this reference and are not admitted to be prior art with respect to the present invention by the mention in this cross-reference section.

The present application is related to and claims priority from prior provisional application Ser. No. 61/713,921 filed Oct. 15, 2012 the contents of which are incorporated herein by this reference and are not admitted to be prior art with respect to the present invention by the mention in this cross-reference section.

DETAILED DESCRIPTION

Figure 1:
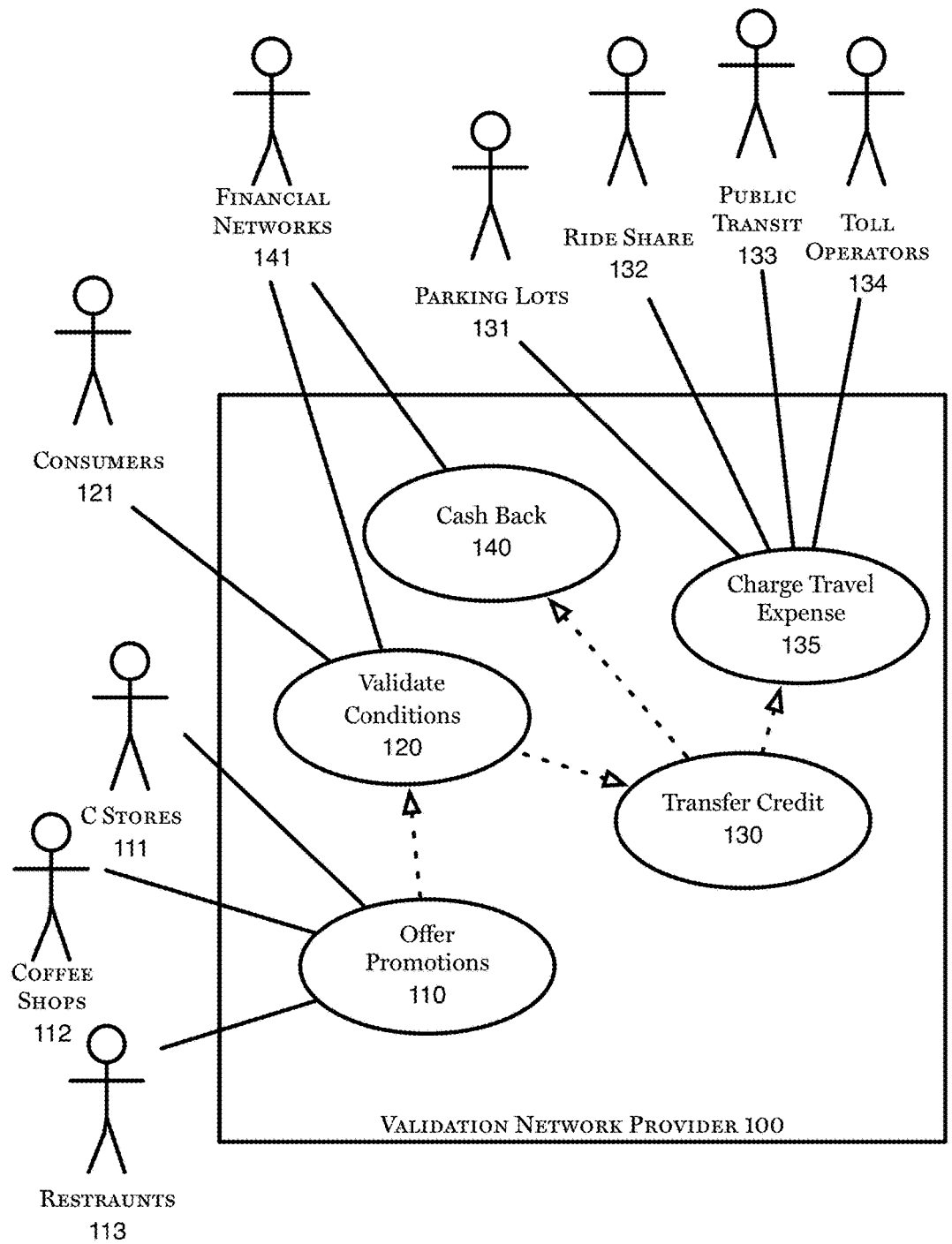
FIG. 1 shows a use case diagram view that illustrates the major functions of the system and method for the consumer-travelers, the merchant-validators, travel-providers and financial networks 141.

FIG. 1 shows a use case diagram view that illustrates the major functions of the system and method for the consumer-travelers 121, the merchant-validators 111-113, travel-providers 131-134 and financial networks 141. Merchant-validators 111-113 can connect to and offer promotional validation (or conditional subsidies or discounts on travel expenses) to consumers 121. This system and method extends the benefits of conditional free shipping offline by allowing consumers 121 to validate a variety of transportation costs 135 (the cost of moving the consumer to the goods) when they patronize participating businesses.

The system 100 extends the benefits of conditional free shipping offline by allowing consumers to validate a variety of transportation costs (the cost of shipping themselves) when they patronize participating businesses. Transportation costs are myriad and can include parking, fuel, taxis, ride shares, mileage, public transport, airfare, train tickets or simply time spent traveling. The advent of mobile technology and related software applications has made it possible to identify and connect in real-time with consumers and provide customized validation options from a wide array of unaffiliated transportation and parking providers and validators simultaneously. The disclosed invention utilizes mobile & cloud based technology to enable validators to tender Validation Offers electronically to potential or existing customers via a plurality of dedicated web and mobile applications on demand or based on one or more factors, including time, location, or interaction with wireless devices or beacons. These Validation Offers can include discounts, reimbursements, cash, cryptocurrency or other incentives available only to customers who meet a pre-determined spending threshold or other condition, confirmed when they interact electronically with a proprietary encoded Validation Token. Validation Offers can be tendered to individual consumers through their personal mobile device (smartphone, tablet, wearable, etc) from a network of validators and transportation and parking providers, allowing consumers to forgo the need to choose a specific provider to obtain access to a particular Validation Offer.

Conditional transportation cost validation enables offline businesses to tap the same psychology that online businesses have exploited to increase the average spending per transaction and to increase customer lifetime value (loyalty). By setting spending thresholds required to earn validation to slightly higher than the historic average spending level, businesses can stimulate increased spending. By setting the validation discount, reimbursement or other reward to an appropriate value, the business can incrementally increase their per transaction profit.

Merchant-validators 111-113 can tender Validation Offers 110 electronically to potential or existing customers via a plurality of dedicated web and mobile applications on demand or based on one or more factors, including time, location, or interaction with wireless devices or beacons. These Validation Offers 110 can include discounts, reimbursements, cash, cryptocurrency or other incentives available only to customers who meet a pre-determined spending threshold or other condition. Mobile technology and related software applications allow the validation network provider 100 to identify and connect in real-time with consumers 121 and provide customized validation options 110 from a wide array of unaffiliated transportation and parking providers 131-134 and merchant-validators 111-113 simultaneously.

Consumers 121 can begin a travel session, or, a travel session can be detected by the system. The Validation Network Provider 100 can present Validation offers 110 to the consumer 121 based on a variety of conditions, including, proximity, past purchase history, time of day, day of week, and other factors typically used in customer loyalty programs. Consumers 121 can validate several offers, thereby increasing the amount of the discount, simply by fulfilling and activating multiple offers. In some embodiments, the amount of the credit can exceed the travel expenses.

The Validate Conditions function 120 confirms that the consumers 121 have met the conditions and the merchant-validators 111-113 can present the consumer 121 with a encoded Validation Token. Validation Offers can be tendered to individual consumers through their personal mobile device (smartphone, tablet, wearable, etc) from a network of validators 111-113 and transportation and parking providers 131-134, allowing consumers to forgo the need to choose a specific provider to obtain access to a particular Validation Offer.

Additionally, the validate conditions function 120 allows the consumer access to a validation token, for example, by scanning a QR (quick response) code, accessing a machine-identifiable marker, connecting to or coming in range of a near field communications device, or arriving at a particular geo-location.

Conditional transportation cost validation enables offline businesses to tap the same psychology that online businesses have exploited to increase the average spending per transaction and to increase customer lifetime value (loyalty). By setting spending thresholds required to earn validation to slightly higher than the historic average spending level, businesses can stimulate increased spending. By setting the validation discount, reimbursement or other reward to an appropriate value, the business can incrementally increase their per transaction profit.

The travel-providers 131-134 charge travel expenses. The accumulated credit from validation offers can offset the travel expense. There are several methods to credit the consumer. The travel-provider 131-134 can integrate with the validation network provider 100 and display the credit after querying the network. The travel-provider 131-134 can receive payment from the validation network provider 100. Alternately, the validation network provider 100 can present cash back to the consumer by an electronic financial transaction with the financial networks 141, as shown.

The order of transactions can vary. For example, some types of travel, such as public transportation, require advance payment. Other types of travel do not require payment until later, such as parking lots. The system accommodates the various customary timing of payments for all travel expense types.

The system 100 must take into account different potential scenarios where the customer extracts value from the validation credits depending on the type of transportation session. In all scenarios, the starting point is when the customer has arrived at their destination, activated their session and visited their first merchant. It is determined that the merchant does offer validation on the platform. The next determination is whether the merchant offers validation that is tied to a spend threshold or offers it as a courtesy despite the amount of money spent by the customer.

If the merchant offers validation on the platform that is tied to a spend threshold, the merchant has determined one or more combinations of a dollar amount of minimum spend to qualify for a specific dollar amount of validation credit. In order to qualify for validation, the customer must meet or exceed one of these tiers of the spend/validation levels. If the customer does not qualify, they do not receive a validation credit, and the merchant is not charged. If the customer does qualify, they are granted the validation credit. The merchant then is charged for the validation credit and a fee to the platform provider for successfully converting a customer into a sale that exceeds the spend threshold. This fee, the "merchant fee," is calculated as a % of the spend threshold that the customer qualified for. By way of example, a scenario where a merchant offers $7 in validation credit if a customer meets or exceeds a pre-tax spend of $100, and the platform provider fee is 2.5% of the spend threshold. If a customer converts into a sale that totals $100 pre-tax and is granted validation, the total charge for the merchant is $9.50. This total charge is broken up into 2 components. $7 of this charge is from the stated validation credit that the merchant has determined. $2.50 of this charge is the merchant fee due to the platform provider, calculated as 2.5%×$100. If a customer converts into a sale that totals $125 pre-tax and is granted validation, the total charge for the merchant is $9.50, with the components of the charge being identical. If a customer converts into a sale that totals $99 pre-tax, they have not qualified for validation, and the total charge for the merchant is $0.

If a merchant offers validation on the platform that is provided as a courtesy to customers, regardless of spend or amount of spend, and possibly in which validation is provided at the sole discretion of the clerk, than the merchant will decide a dollar amount of validation to provide each time it is granted. The total cost to the merchant each time a validation is granted can be equal to the dollar amount of validation credit provided plus a dollar amount of merchant fee due to the platform provider. By way of example, if a merchant participates in the platform by offering $5 of validation credit to a customer regardless of spend and has agreed to pay a $1 fee to the validation network provider each time a validation is granted, the total charge to the merchant is $6 each time.

Figure 2:
FIG. 2 shows a computer screenshot view that illustrates the event of a consumer check-in to a travel provider, for example, a parking garage or parking lot.
Figure 3:
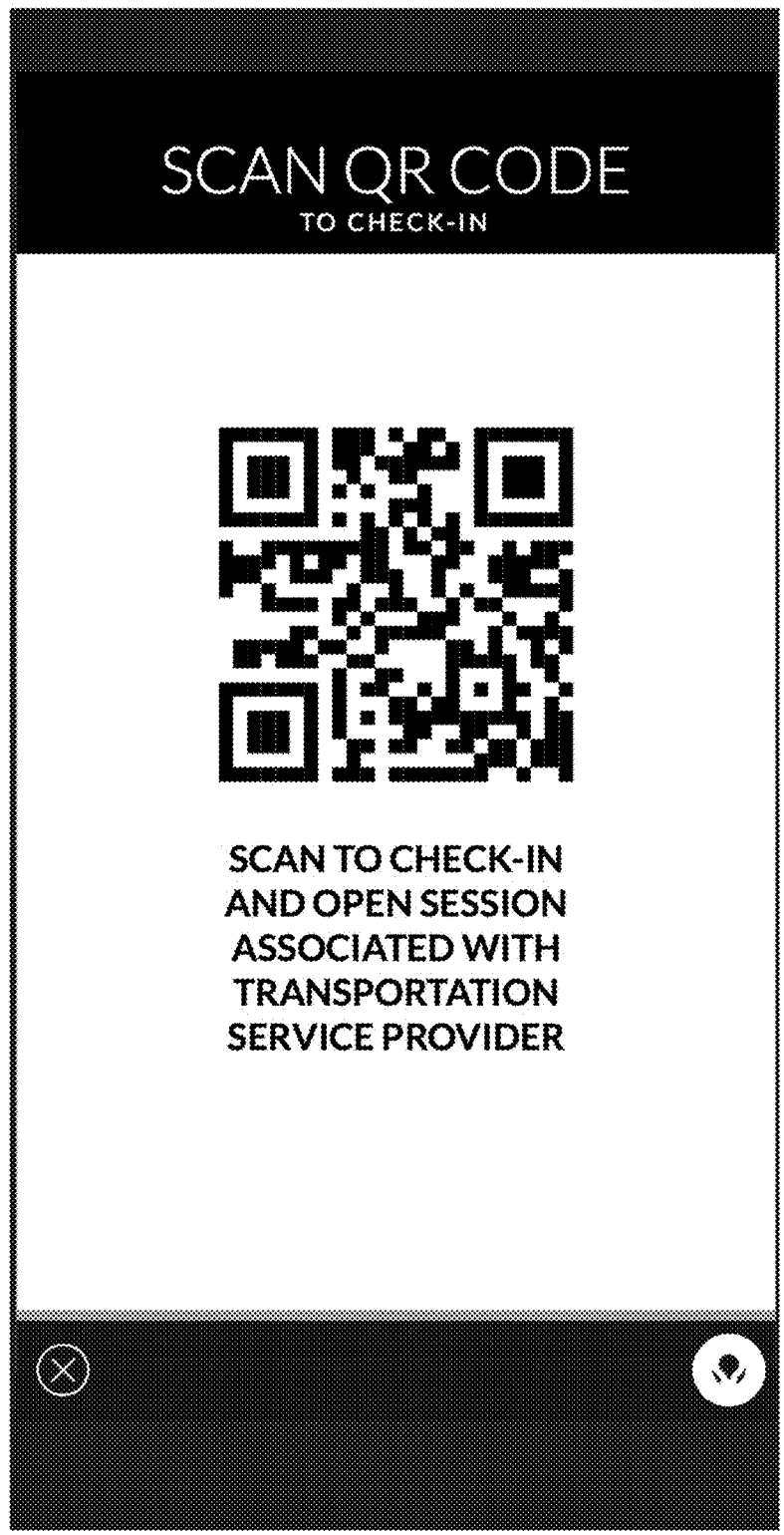
FIG. 3 shows a computer screenshot view that illustrates the event of qr-scan check-in to a travel provider.
Figure 4:
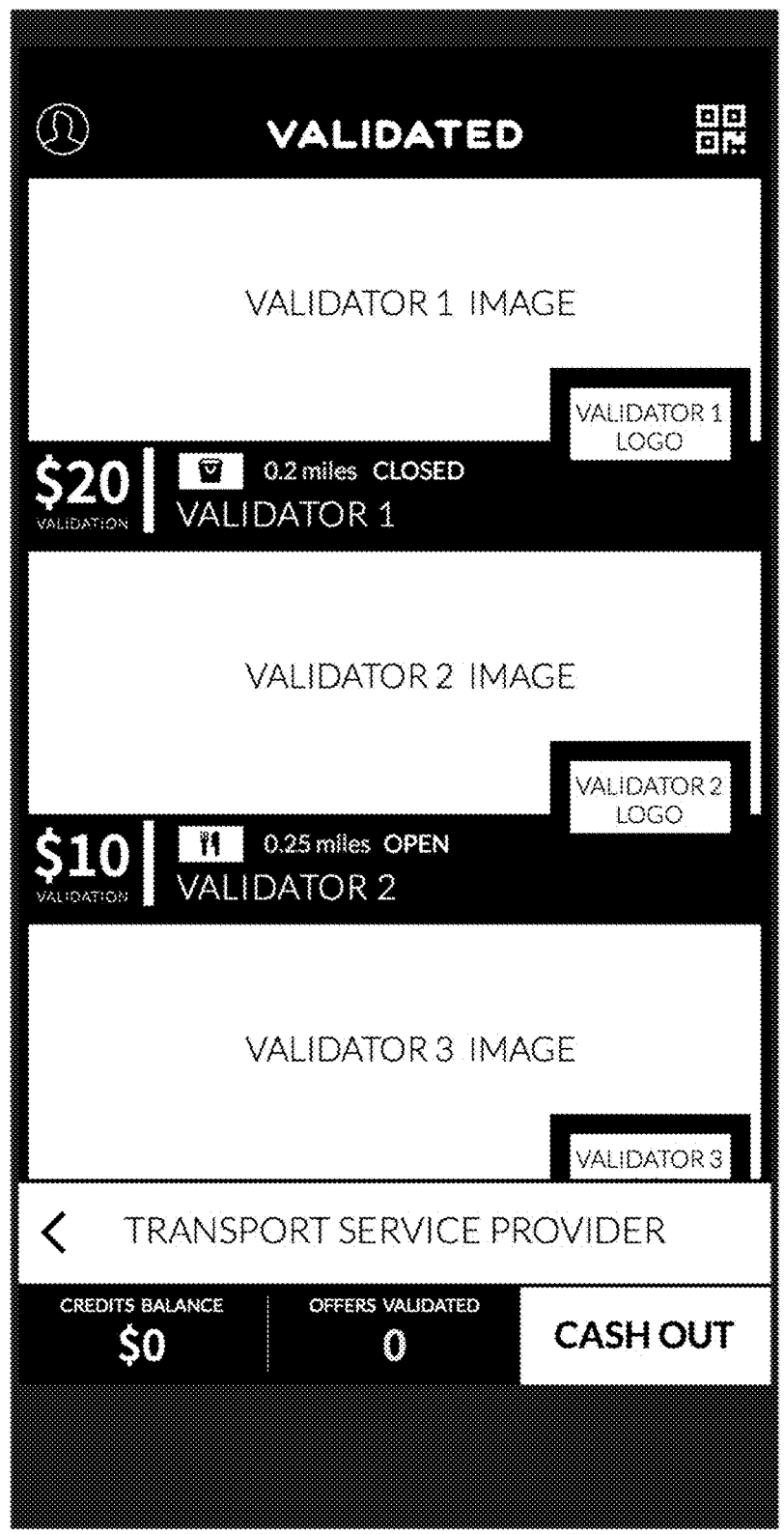
FIG. 4 shows a computer screenshot view that illustrates a list of promotional validations offers by merchants near the check-in event.
Figure 5:
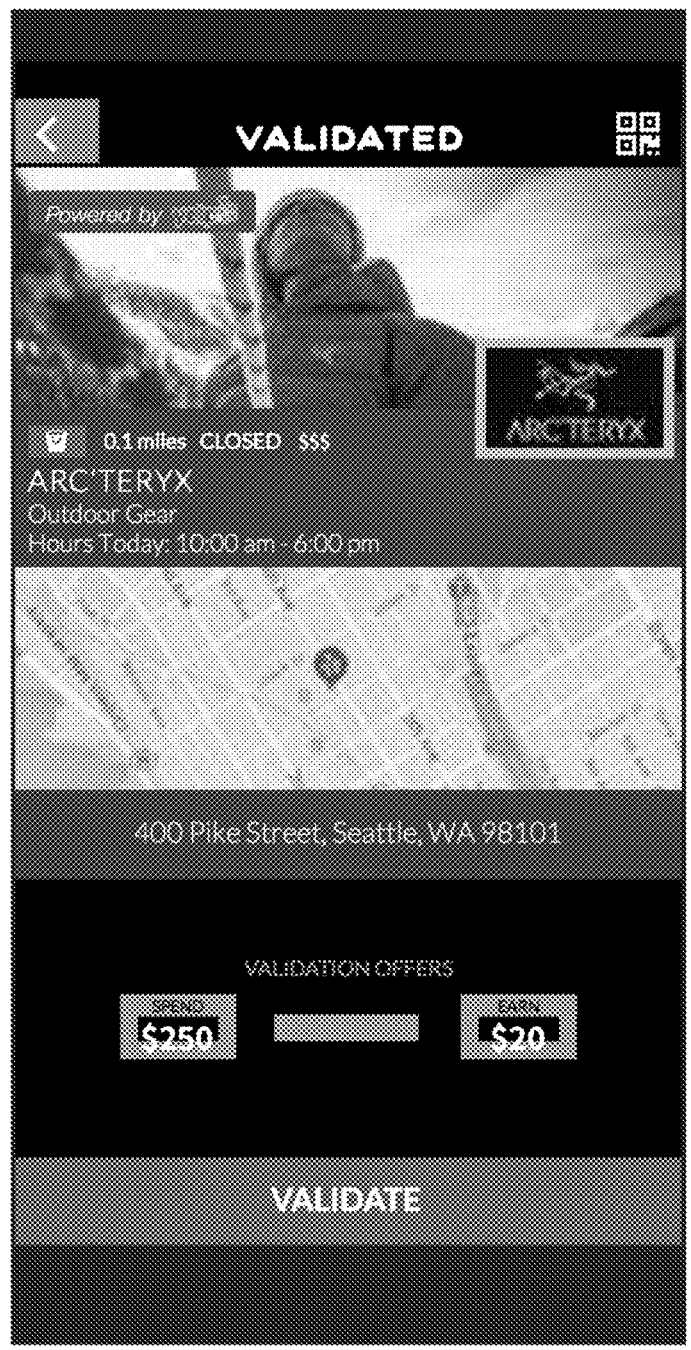
FIG. 5 shows a computer screenshot view that illustrates the step immediately prior to entering validation of a particular promotional offer by a merchant.
Figure 6:
FIG. 6 shows a computer screenshot view that illustrates the event of qr-scan or optical scan of a validation token at the merchant after purchase.
Figure 7:
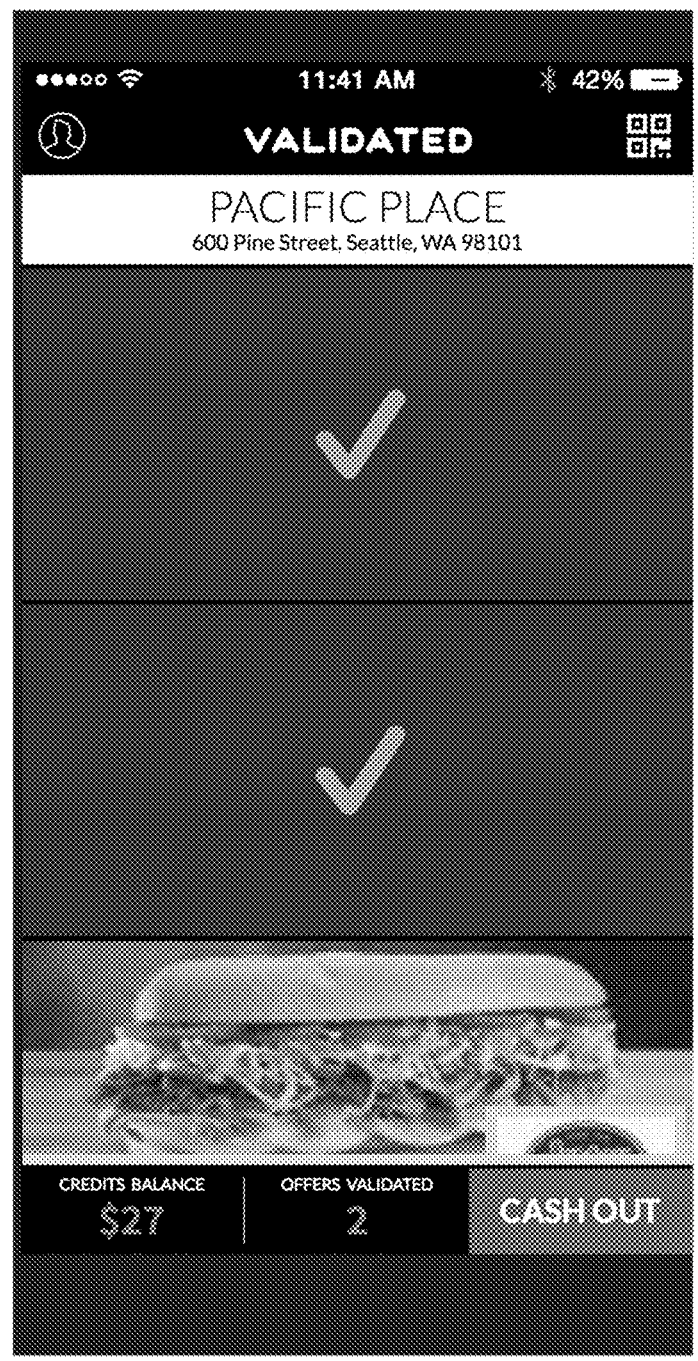
FIG. 7 shows a computer screenshot view that illustrates a list of completed promotional validation offers, including the credit provided by the merchants.
Figure 8:
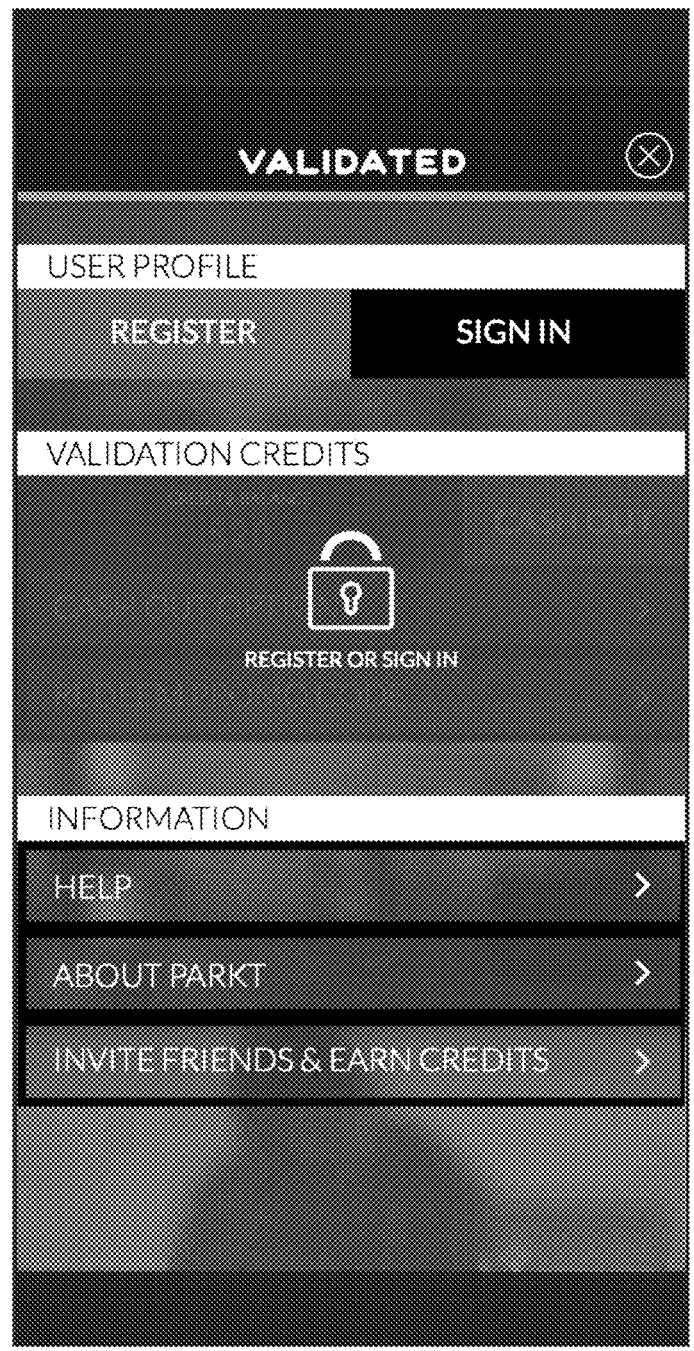
FIG. 8 shows a computer screenshot view that illustrates a signup form to allow claim of the credit.
Figure 9:
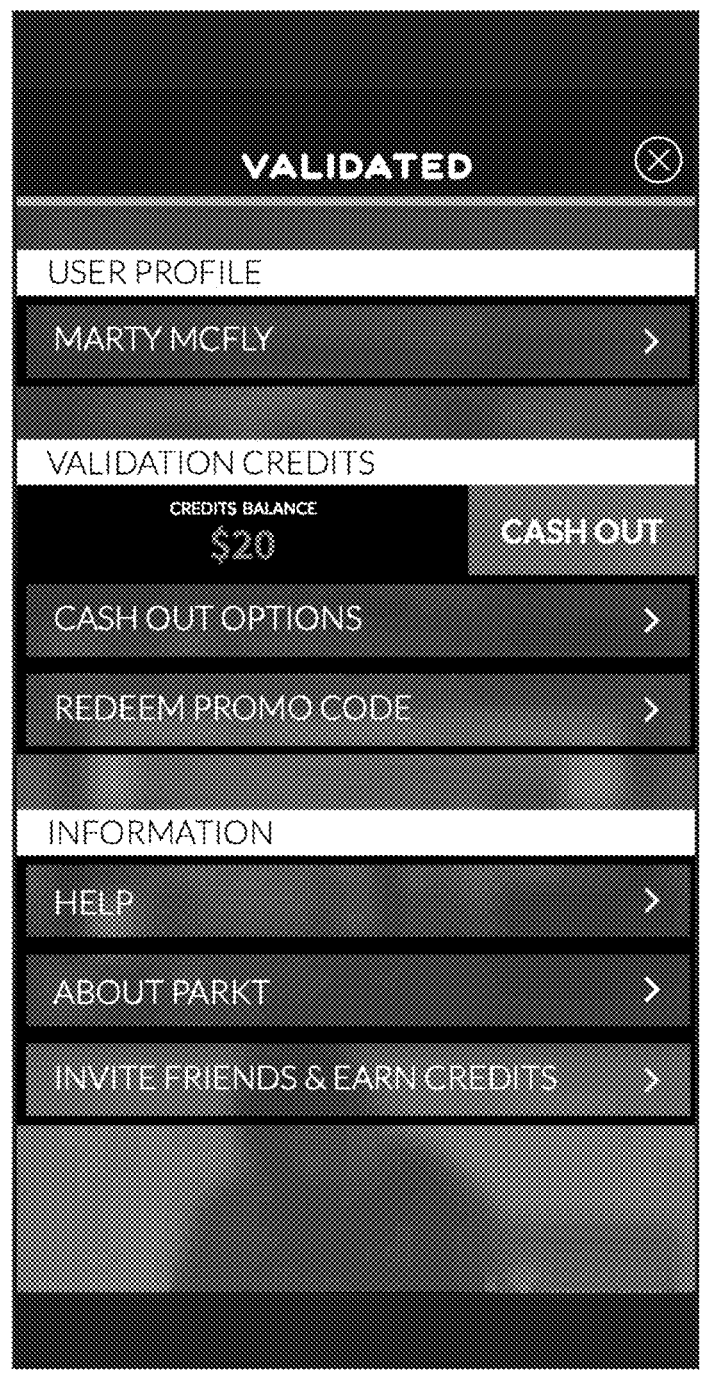
FIG. 9 shows a computer screenshot view that illustrates a selection form to initiate a credit transaction.
Figure 10:
FIG. 10 shows a computer screenshot view that illustrates a selection form to select among various credit cards, bank accounts or other payment networks.
Figure 11:
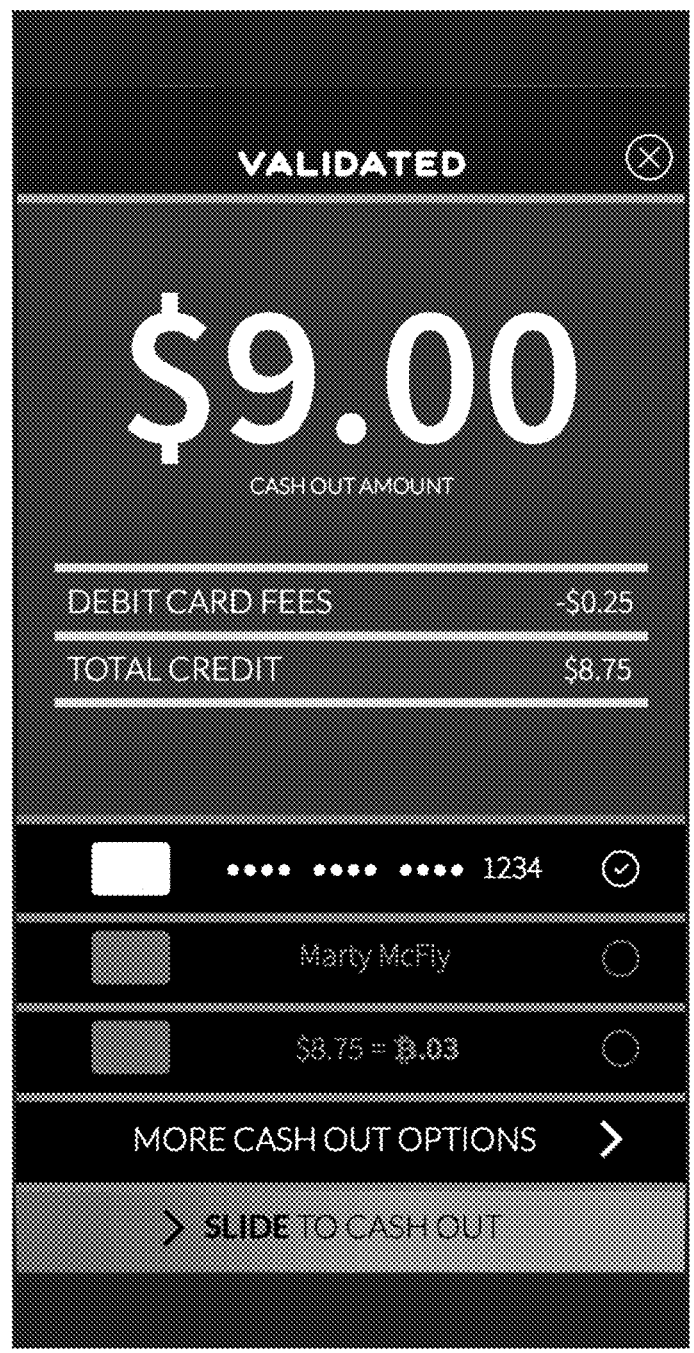
FIG. 11 shows a computer screenshot view that illustrates a detail form to verify the details of the financial transaction for credit immediately prior to processing.
Figure 12:
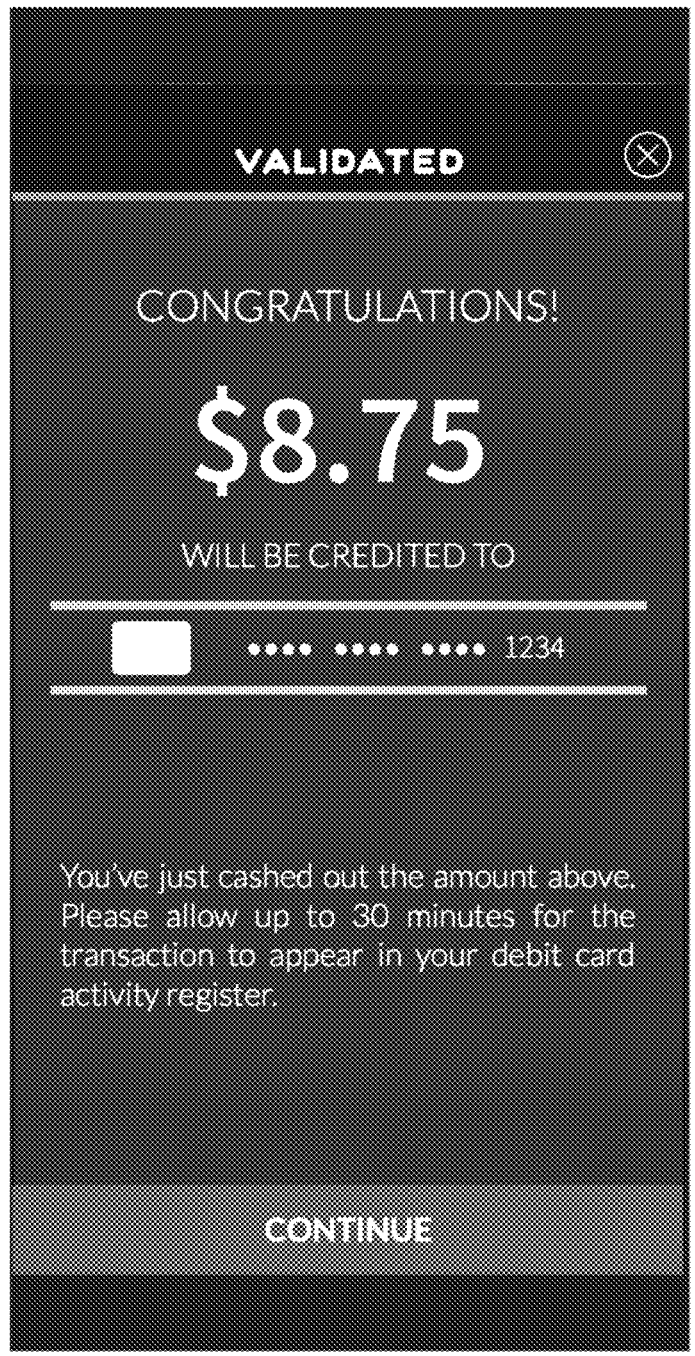
FIG. 12 shows a computer screenshot view that illustrates a receipt form to show the financial transaction processing is complete.

FIG. 2 shows a computer screenshot view that illustrates the event of a consumer check-in to a travel provider, for example, a parking garage or parking lot. The system 200 shows a screen of a web or mobile computer program application running on a mobile device. System 200 shows the user-interface for providing mobile-based validation of promotional offers. The system 200 comprises allowing parkers to choose specific parking validation offers 210 or parking discounts from nearby validators. The system 200 can present the validation offers to the application user or parker, enabling validators to send their specific offers directly to individual parkers. Additionally, the system 200 can present the discounts activated by parkers to a parking facility for redemption by cashiers, automated revenue control systems or parking meters.

The system 200 includes a means to generate an electronic "ticket" for the consumer that references a parking session (or other travel expense) in a paid parking environment and display the consumer's ticket on a smartphone, tablet or other computing device. Interactive elements are included on the electronic ticket such as validation offers 210 from the validators, user controls 220 that allow details of the specific offer to be viewed, data to allow the sponsoring validator to verify the offer and the ticket, and display of the aggregated parking savings from the sum of all offers activated during the parking session (See FIGS. 4, 5, 7, 9, etc.). Additionally, the system 200 includes a means for parkers to activate an offer once it has been verified by the sponsoring merchant by interaction with a proprietary validation token provided to validators. The validation token can take several forms, examples of which are a 2D optical code, other machine identifiable markers, a near-field communications device. In certain embodiments the system might include a control to allow parkers to elect to receive credit, in the form of fiat currency, crypto-currency, or gift card points in lieu of a discount to parking fees. Methods for viewing, activating and redeeming a mobile validation offers are disclosed herein.

Figure 13:
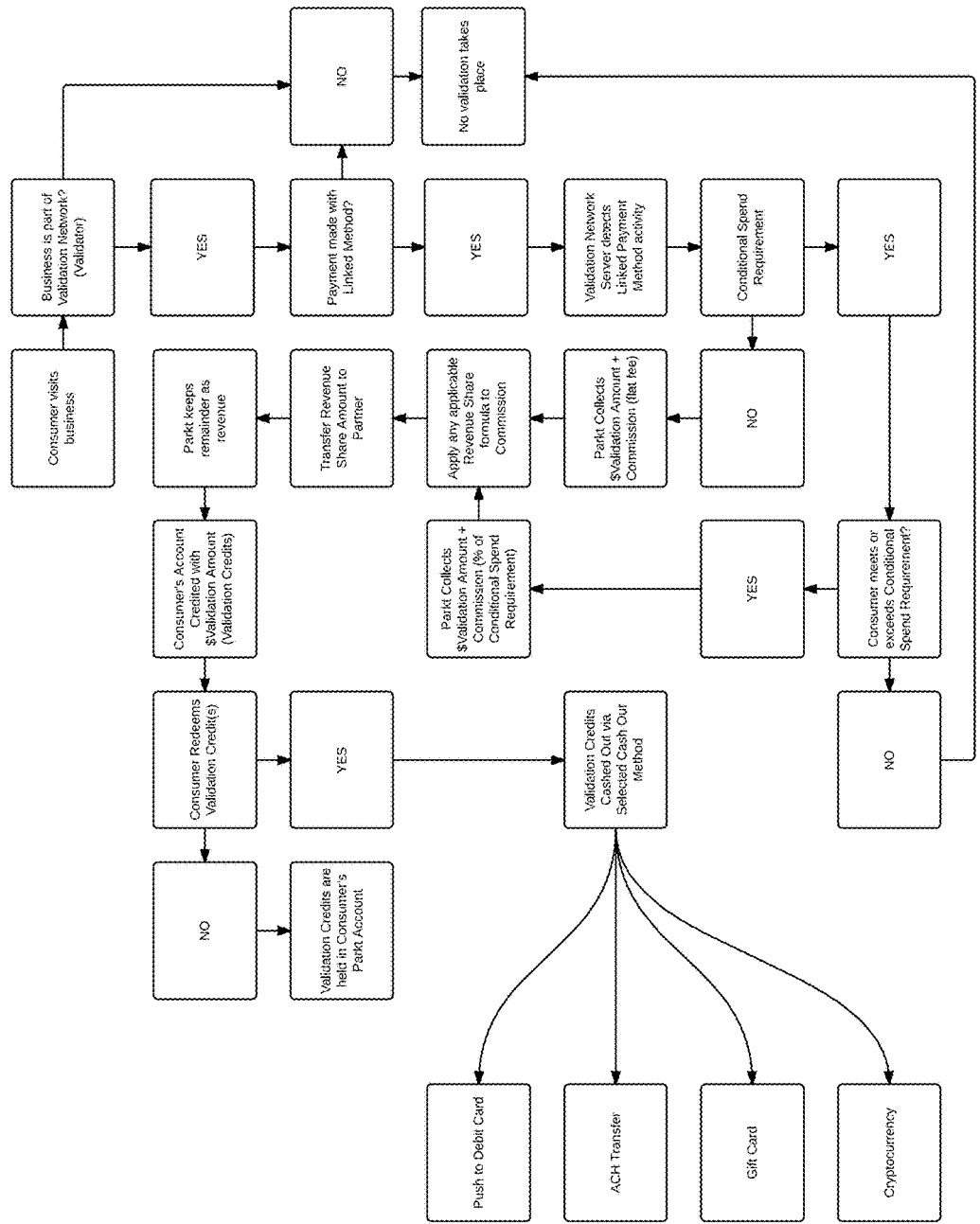
FIG. 13 shows a flowchart view that illustrates the process of verifying that the promotional offer conditions have been met by querying a payment network that has been linked to the validation network.

The first scenario, shown in FIG. 13, shows the steps for a validation offer from a merchant, where the merchant's equipment, merchant's revenue control systems, or merchant's fare collection systems do not integrate with the Validation Network Provider. The customer visits the merchant's physical location and is granted validation by either spend threshold qualification or as a courtesy, depending on the merchant's terms for the promotional validation offer. For each validated promotional offer, the customer will be credited a dollar amount paid by the merchant. The customer can be limited to one validation per day from an individual merchant, but can visit multiple merchants on a single day and "stack" validation credits from each of them. In this scenario, when the customer visit is ending, or has already ended, the customer can choose to send the validation credits directly into their bank account [through push to card process described earlier] to offset the parking or transportation costs that will be incurred as a result of the trip. The validation network provider is responsible for collecting the validation credit and the merchant fee from the merchant(s) that provided the credit, and delivering to the relevant platform user. Once validation dollars are delivered, the remaining money from the session is the full amount of the merchant fee. In some embodiments, the validation network provider may have an arrangement with the transportation operator used in the session where a portion of this merchant fee is shared with the operator as part of a mutually beneficial business partnership. If such a fee sharing agreement does not exist, the validation network provider books the entire merchant fee as revenue. If a fee sharing agreement does exist, the validation network provider delivers the portion of the merchant fee owed to the transportation operator, and books the remaining amount as revenue.

Figure 14:
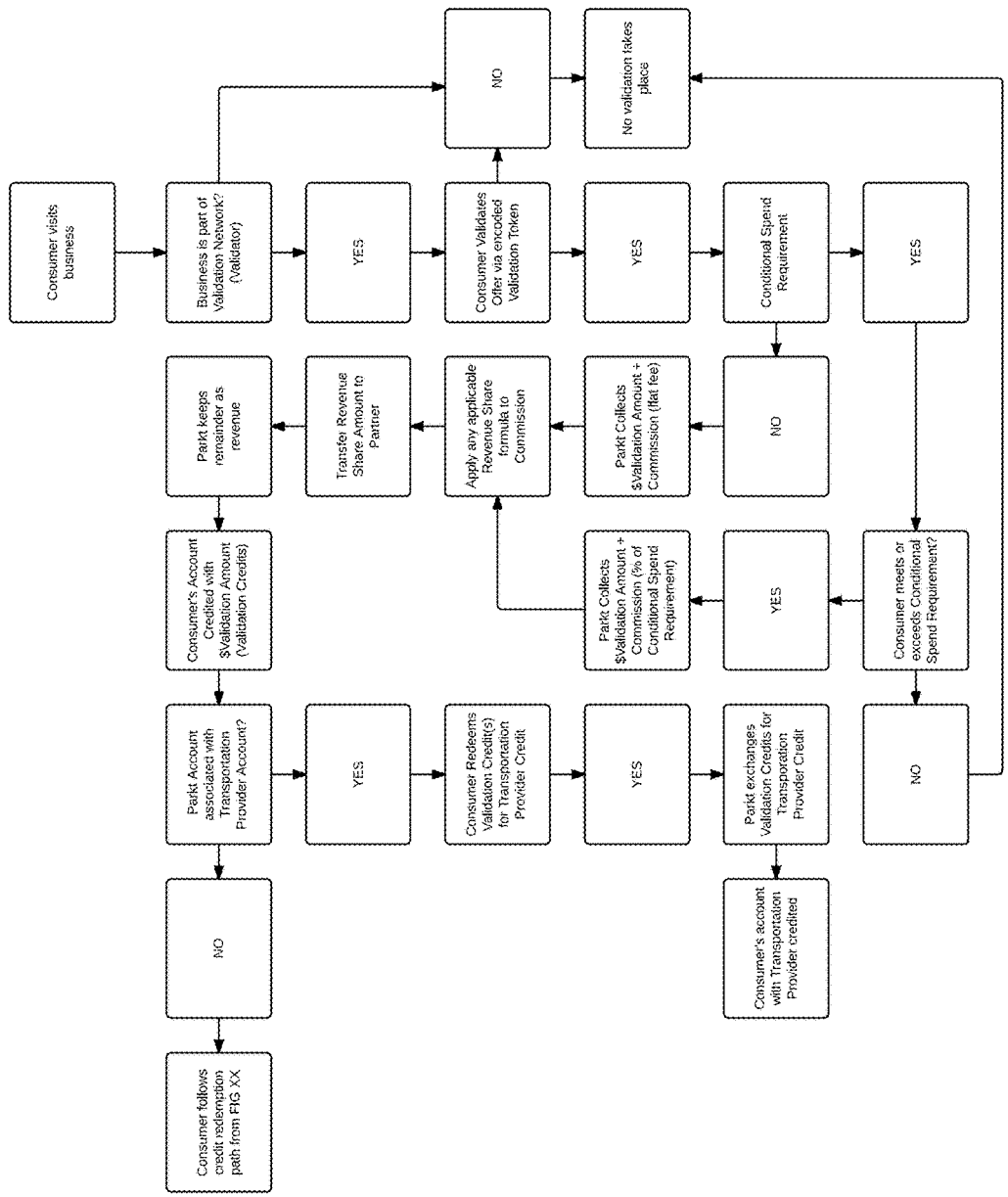
FIG. 14 shows a flowchart view that illustrates the process of verifying that the promotional offer conditions have been met via an encoded validation token available from the merchant.

The second scenario, shown in FIG. 14, is an integrated parking session where the validation credits from the platform provider interact with the parking operators equipment, revenue control and fare collection. The customer has visited the merchant and is granted validation by either spend threshold qualification or as a courtesy. In each instance, the customer will be credited a dollar amount of validation from the merchant. The customer is limited to one validation per day from an individual merchant, but can visit multiple merchants on a single day and "stack" validation credits from each of them. In this scenario, when the customer visit is ending, or has already ended, the customer will have the option to directly apply the validation credits to discount the parking fees that will be realized at the end of their parking session. Applying the validation credits in this scenario can result in a final parking cost to the customer that is reduced or a final cost to the customer that is completely free of charge. The platform provider is responsible for collecting the validation credit and the merchant fee from the merchant(s) that provided the credit. The platform provider will then send the dollar amount of validation credits applied to the session to the relevant parking operator. In some cases, but not all cases, the platform provider may have an arrangement with the parking operator used in the session where a portion of this merchant fee is shared with the operator as part of a mutually beneficial business partnership. If a fee sharing agreement does exist, the platform provider delivers the portion of the merchant fee owed to the parking operator along with the validation credit owed, and the remaining amount of the merchant fee is booked as revenue. If such a fee sharing agreement does not exist, the platform provider books the entire merchant fee as revenue. There may be a scenario where the total validation credits received are greater than the final direct cost of the parking session, or "over-validation", in which case the final parking cost realized to the parking customer is free of charge, and the customer is allowed to keep the excess validation credits for a future transportation session or to send directly into their bank account as cash. In this case, the platform provider will hold the cash collected from the merchant for the purposes of validation until the user chooses to extract value from the credit. If the user chooses to send the credit directly into their bank account as cash, the platform provider will send the held credit directly to the user. If the user chooses to apply the credit to a future transportation session's cost, the platform provider will send the held credit to the relevant transportation provider in the session.

Figure 15:
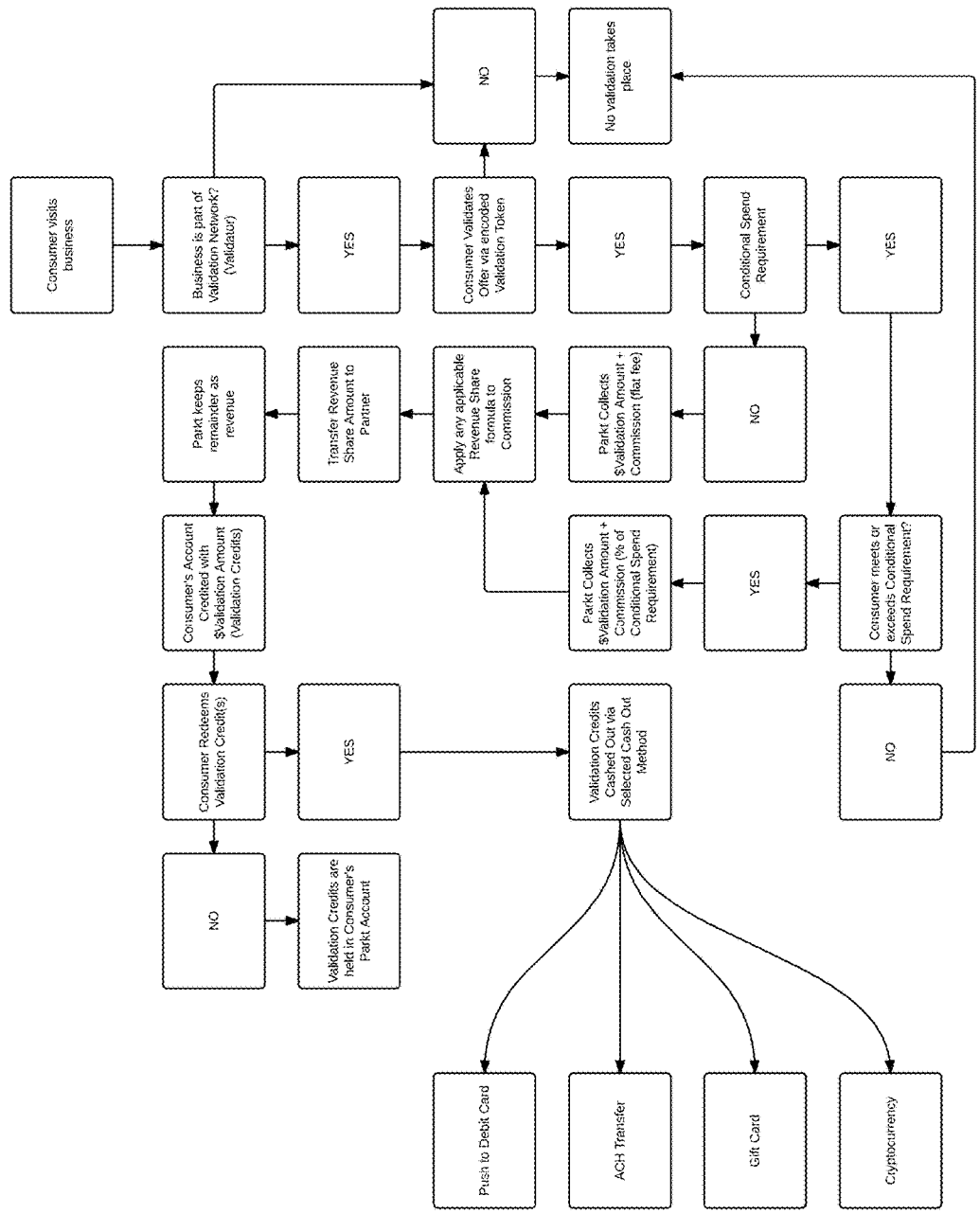
FIG. 15 shows a flowchart view that illustrates an embodiment where the consumer validates a promotional offer by en encoded validation token at the merchant, and then, later selects between any of the available financial transactions to obtain cash back in the amount of the offer.
Figure 16:
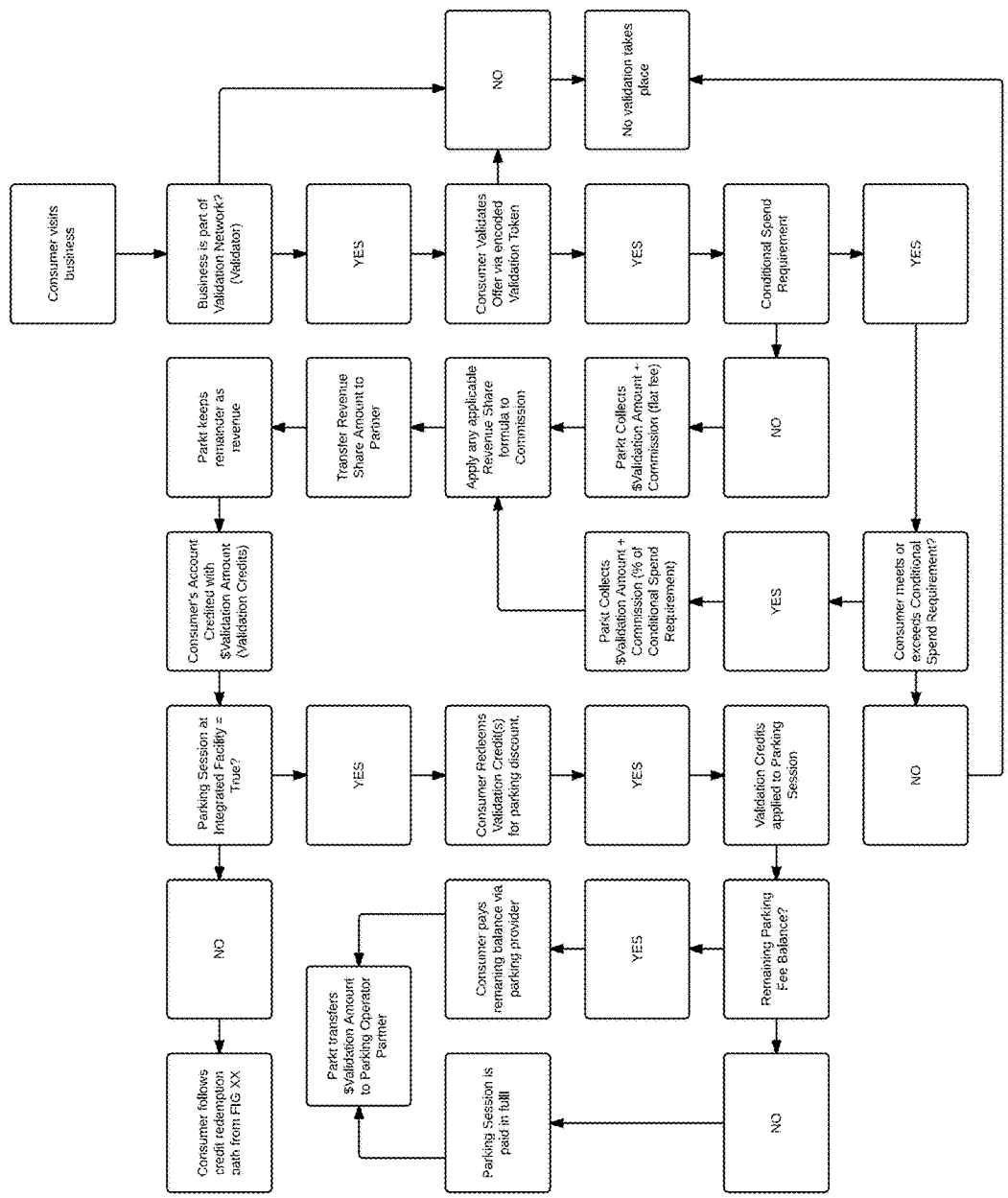
FIG. 16 shows a flowchart view that illustrates an embodiment where the consumer validates a promotional offer, and, the validation network provider later transfers the validation amount from the merchant to the travel provider.
Figure 17:
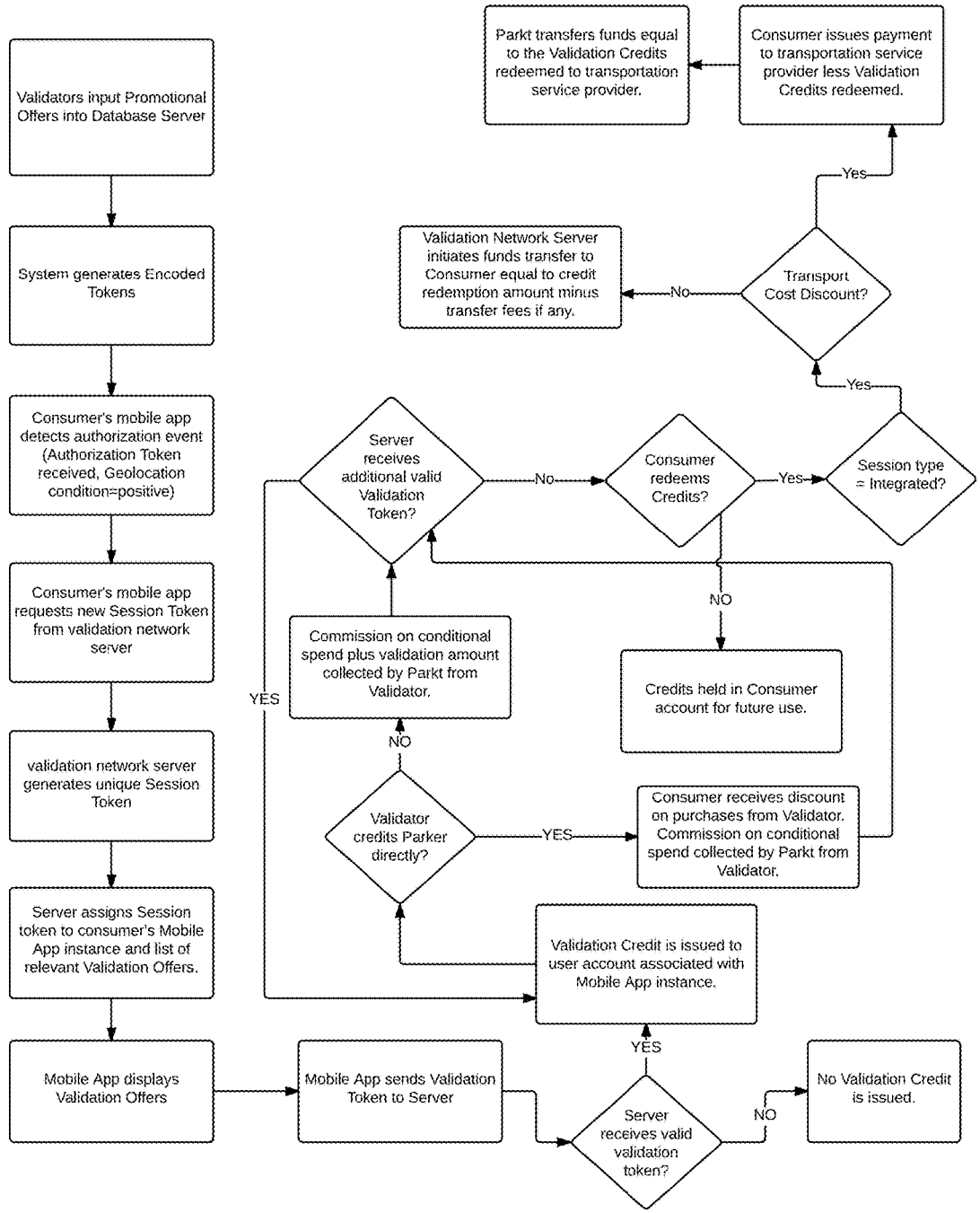
FIG. 17 shows a flowchart view that illustrates an overview of the method from receiving promotional offers from merchants, validation of the offers by consumers, and crediting to travel providers or financial networks.
Figure 18:
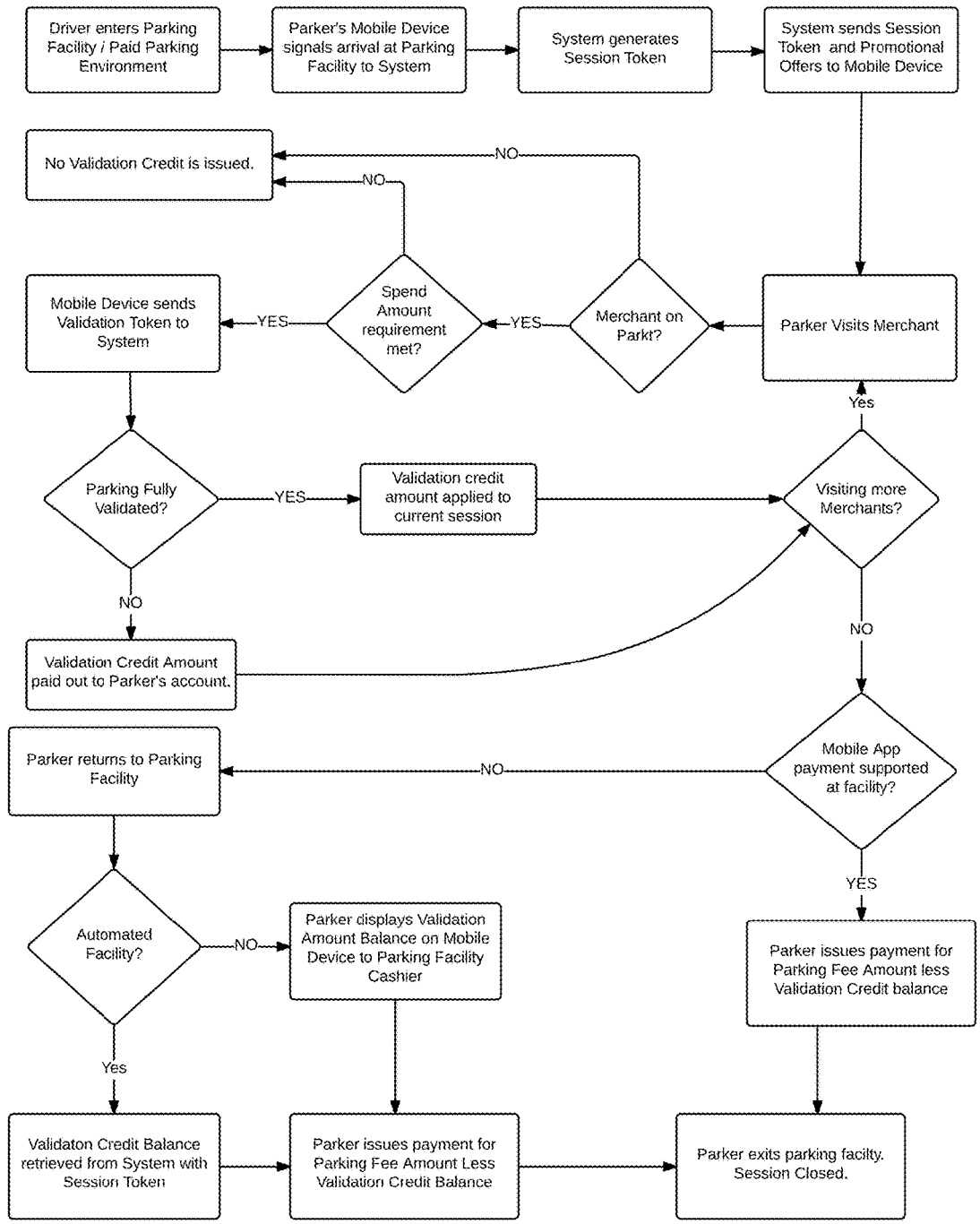
FIG. 18 shows a flowchart view that illustrates an embodiment of the present invention where the travel provider is a parking facility and the consumer is driving a car.
Figure 19:
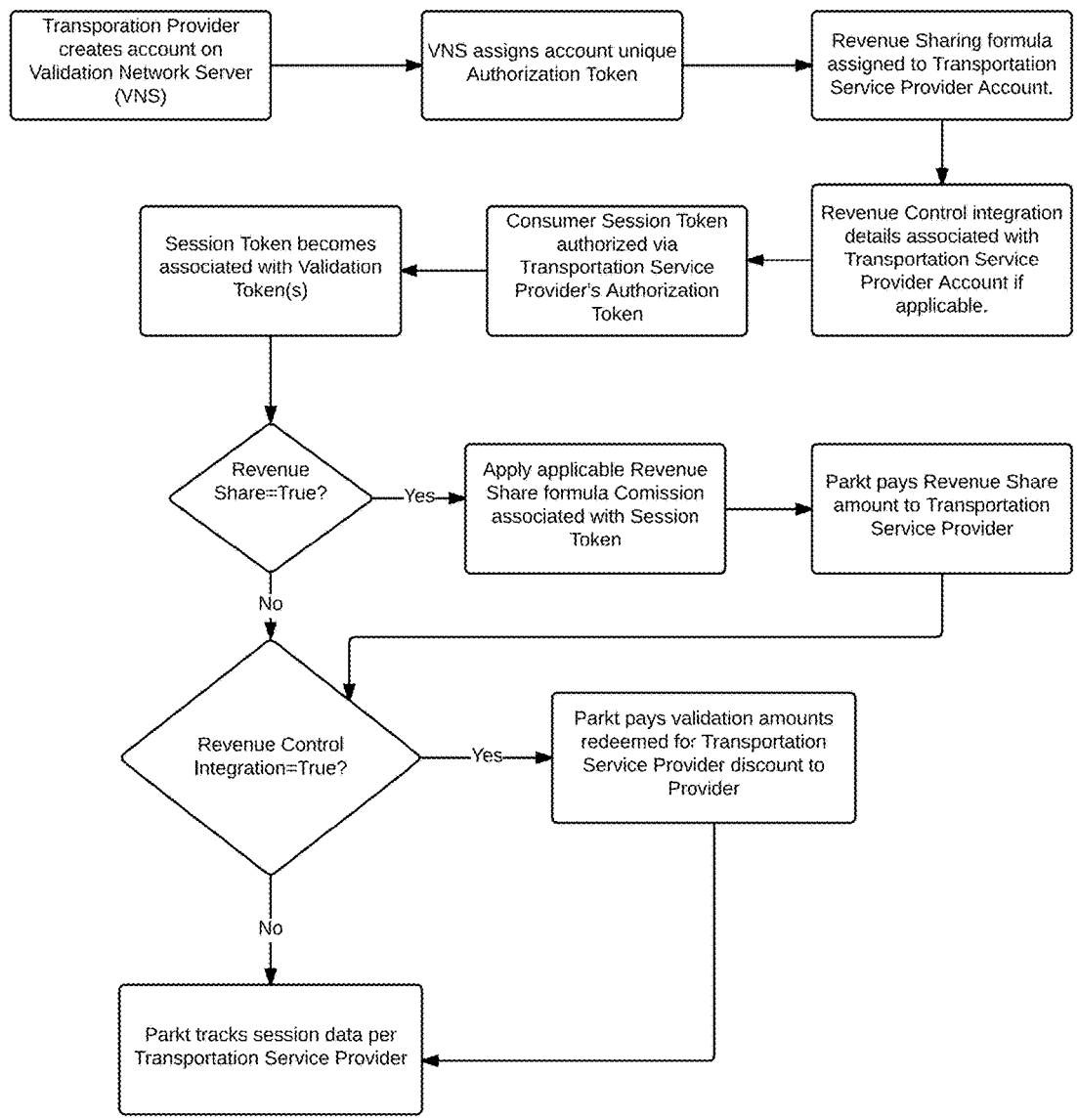
FIG. 19 shows a flowchart view that illustrates an embodiment of present invention showing how transportation providers can share revenue or integrate revenue control.
Figure 20:
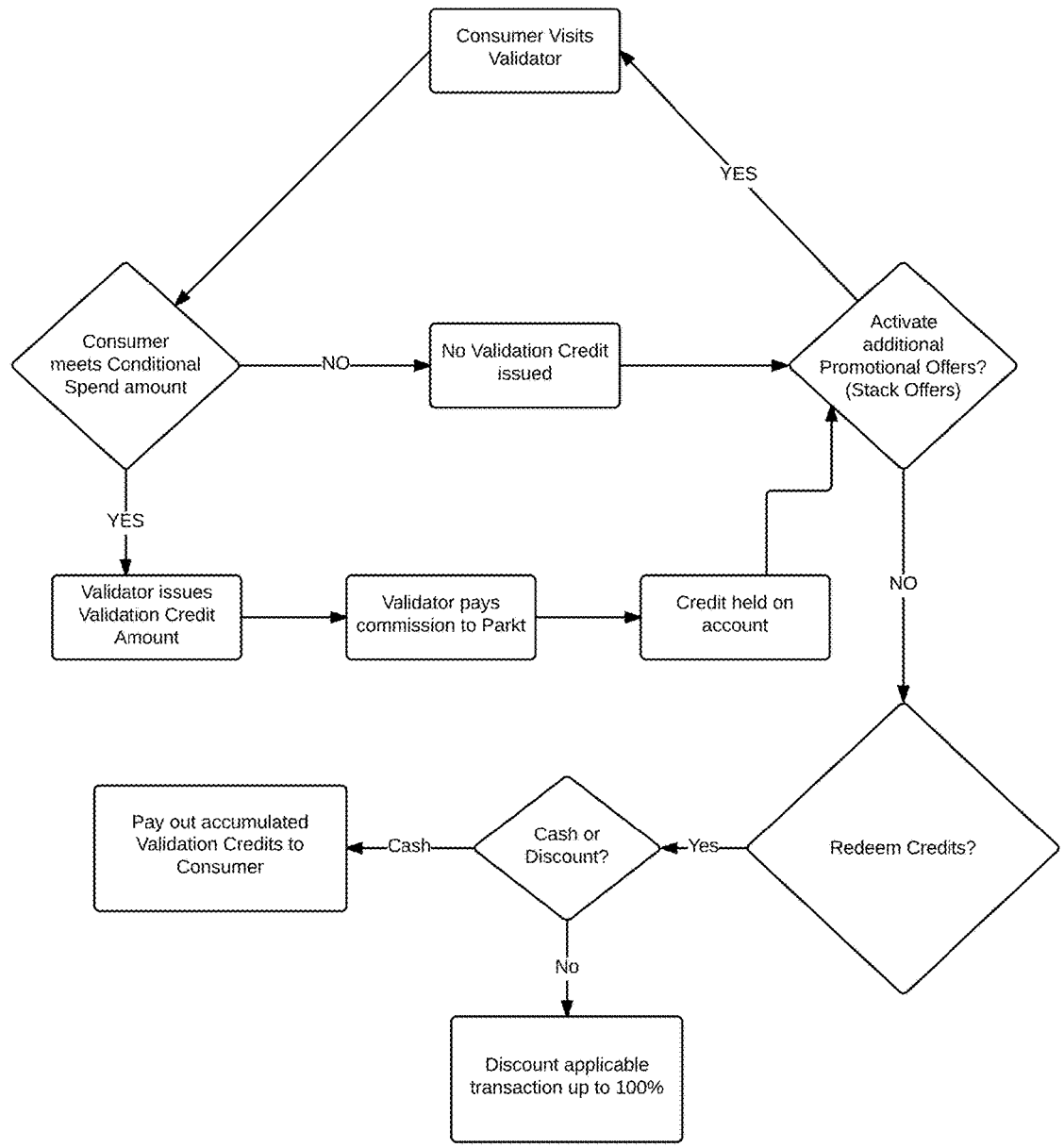
FIG. 20 shows a flowchart view that illustrates an embodiment of present invention showing how consumers can visit multiple merchants and receive multiple validations of promotional offers during a single travel session.
Figure 21:
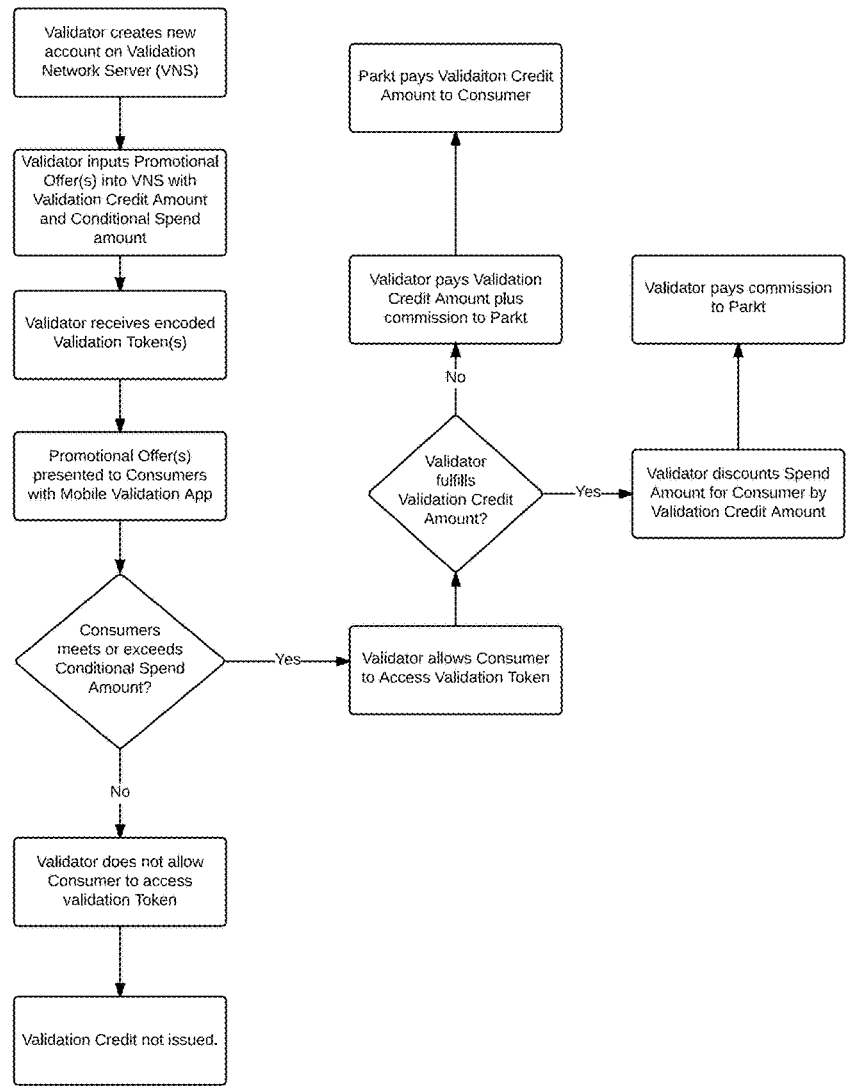
FIG. 21 shows a flowchart view that illustrates an embodiment of present invention that permits a merchant/validator to offer promotional validation offers, permit access to the validation token whenever a consumer meets the conditions of the offer, and pays commission plus credit to the validation network.

The Third Scenario, showcased in FIG. 15, is a session where the transportation method chosen by the customer allows for individual user accounts that can store value by purchasing credit, and the platform provider is an integrated partner with the transportation provider that can act as a method of feeding the user accounts stored value. The customer has visited the merchant and is granted validation by either spend threshold qualification or as a courtesy. In each instance, the customer will be credited a dollar amount of validation from the merchant. The customer is limited to one validation per day from an individual merchant, but can visit multiple merchants on a single day and "stack" validation credits from each of them. In this scenario, when the customer visit is ending, or has already ended, the customer has or will link their account with the relevant transportation provider into the platform provider. The customer will choose to send the validation credits directly into their account with the transportation provider to offset the costs that have been incurred, or will be incurred on the return trip. The platform provider is responsible for collecting the validation credit and the merchant fee from the merchant(s) that provided the credit, and delivering to the relevant transportation provider, so that the transportation provider realizes collects the full amount of fare that is owed. In some cases, but not all cases, the platform provider may have an arrangement with the transportation operator used in the session where a portion of this merchant fee is shared with the operator as part of a mutually beneficial business partnership. If a fee sharing agreement does exist, the platform provider delivers the portion of the merchant fee owed to the transportation operator along with the validation credit owed, and the remaining amount of the merchant fee is booked as revenue. If such a fee sharing agreement does not exist, the platform provider books the entire merchant fee as revenue. There may be a scenario where the platform user makes the decision to store all or a portion of the validation credit from the session for future use, or send directly into their bank account as cash. In this case, the platform provider will hold the cash collected from the merchant for the purposes of validation until the user chooses to extract value from the credit. If the user chooses to send the credit directly into their bank account as cash, the platform provider will send the held credit directly to the user. If the user chooses to apply the credit to a future transportation session's cost, the platform provider will send the held credit to the relevant transportation provider in the future sessions.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

We claim:

1. A method for verification of travel and a purchase to prevent fraudulent redemption of a promotional offer for conditional transportation cost validation, the method comprising the steps of:

associating a pre-existing dataset representing a travel expense event to a consumer's mobile computing device via association with an encoded token;

monitoring, by a validation network provider across a computer network, the customer's mobile computing device and the token;

providing data from the dataset based on the customer's mobile computing device based on that monitoring;

updating the dataset with new or modified data from the customer's mobile computing device by referencing the encoded token; and updating the dataset across a computer network with new or modified data from a merchant that validates the promotional offer for its patrons;

wherein:

the travel is verified when the customer takes a specific action with the customer's mobile computing device when the customer is present at the merchant's physical location;

the merchant allows the customer to access the encoded token when the customer takes the specific action with the customer's mobile computing device when the customer is present at the merchant's physical location;

the purchase is confirmed when the customer interacts electronically with the encoded token using the customer's mobile computing device; and the promotional offer is to reimburse the customer for travel expenses the customer incurs for traveling to or from the merchant's physical location.

2. The method of claim 1 wherein the specific action comprises scanning a QR code, accessing a machine-identifiable marker, connecting to or coming in range of a near field communications device, or arriving at a particular geo-location.

3. The method of claim 1 wherein the travel expenses comprise expenses for: parking, fuel, taxis, ride shares, mileage, public transport, airfare, train tickets or time spent traveling.

4. The method of claim 1 wherein the travel expenses may be reimbursed through credits with a transportation provider, cash back to the customer by an electronic financial transaction, crypto-currency, or a gift card.

* * * * *